(12) United States Patent
Igari et al.

(10) Patent No.: US 8,634,073 B2
(45) Date of Patent: Jan. 21, 2014

(54) ILLUMINATION APPARATUS AND METHOD FOR OBTAINING ILLUMINANCE WITH HIGH UNIFORMITY BY CONTROLLING A PLURALITY OF MINUTE MIRRORS OF A DIGITAL MIRROR DEVICE

(75) Inventors: Sanekazu Igari, Ishioka (JP); Tsutomu Okura, Hachioji (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 731 days.

(21) Appl. No.: 12/766,428

(22) Filed: Apr. 23, 2010

(65) Prior Publication Data

US 2010/0274392 A1  Oct. 28, 2010

(30) Foreign Application Priority Data

Apr. 25, 2009  (JP) ................................. 2009-107210
Jul. 28, 2009  (JP) ................................. 2009-175940

(51) Int. Cl.
*G01N 15/02* (2006.01)

(52) U.S. Cl.
USPC .......................................... 356/336; 250/205

(58) Field of Classification Search
USPC .................. 250/205, 339.07, 339.08, 339.09, 250/339.1, 339.11, 339.12; 372/29.01, 372/29.11, 29.014; 362/1, 2, 296.09
See application file for complete search history.

(56) References Cited

U.S. PATENT DOCUMENTS

| | | | |
|---|---|---|---|
| 7,692,784 B2* | 4/2010 | MacKinnon et al. | 356/300 |
| 8,018,589 B2* | 9/2011 | MacKinnon et al. | 356/300 |
| 2005/0213092 A1* | 9/2005 | MacKinnon et al. | 356/336 |
| 2005/0243312 A1* | 11/2005 | Geshwind et al. | 356/310 |
| 2006/0170880 A1* | 8/2006 | Dambach et al. | 353/84 |
| 2008/0316484 A1* | 12/2008 | Christian et al. | 356/326 |
| 2009/0103087 A1* | 4/2009 | Christian et al. | 356/326 |
| 2010/0253935 A1* | 10/2010 | MacKinnon et al. | 356/51 |
| 2010/0301218 A1* | 12/2010 | Ayer | 250/341.1 |

FOREIGN PATENT DOCUMENTS

| | | |
|---|---|---|
| JP | 05-183851 A | 7/1993 |
| JP | 08-146911 A | 6/1996 |
| JP | 2002-189178 A | 7/2002 |

* cited by examiner

*Primary Examiner* — Francis M Legasse, Jr.
*Assistant Examiner* — Bao-Luan Le
(74) *Attorney, Agent, or Firm* — Sughrue Mion, PLLC (57) ABSTRACT

An illumination apparatus of the present invention quickly adjusts illuminance of the light radiated from the light source in the irradiation surface to have high uniformity. The illumination apparatus includes the light source that emits a light beam having a rectangular shape, a DMD on which light emitted from the light source is incident and which controls reflection/non-reflection of the incident light by opening/closing control of minute mirrors, an optical system that shapes the light reflected by the DMD, a half mirror that splits the light emitted from the optical system into irradiation light and monitor light, the irradiation surface irradiated with the irradiation light, a monitor unit that measures illuminance of the monitor light, and a control unit that transmits a control signal to control opening/closing of the minute mirrors of the DMD to the DMD, based on a measurement result measured by the monitor unit. In this case, an illuminance distribution in the irradiation surface is adjusted to a predetermined value.

10 Claims, 7 Drawing Sheets

ILLUMINATION APPARATUS AND METHOD FOR OBTAINING ILLUMINANCE WITH HIGH UNIFORMITY BY CONTROLLING A PLURALITY OF MINUTE MIRRORS OF A DIGITAL MIRROR DEVICE

BACKGROUND OF THE INVENTION

1. Field of the Invention

The present invention relates to an illumination apparatus and an illumination method in which illuminance with high uniformity is obtained at a high speed. In particular, the present invention relates to an illumination apparatus and an illumination method in which illuminance with high uniformity can be realized at a high speed, in an irradiation surface, such as a spectroscope having as large an area as a solar cell module or a solar simulator, which is applied to large area irradiation.

2. Description of the Related Art

In order to accurately measure a solar cell based on a solar simulator, illuminance in an irradiation surface needs to have high uniformity, for example, uniformity within a range of ±2% in a class A corresponding to a highest level in a standard measuring method.

Figure 7:
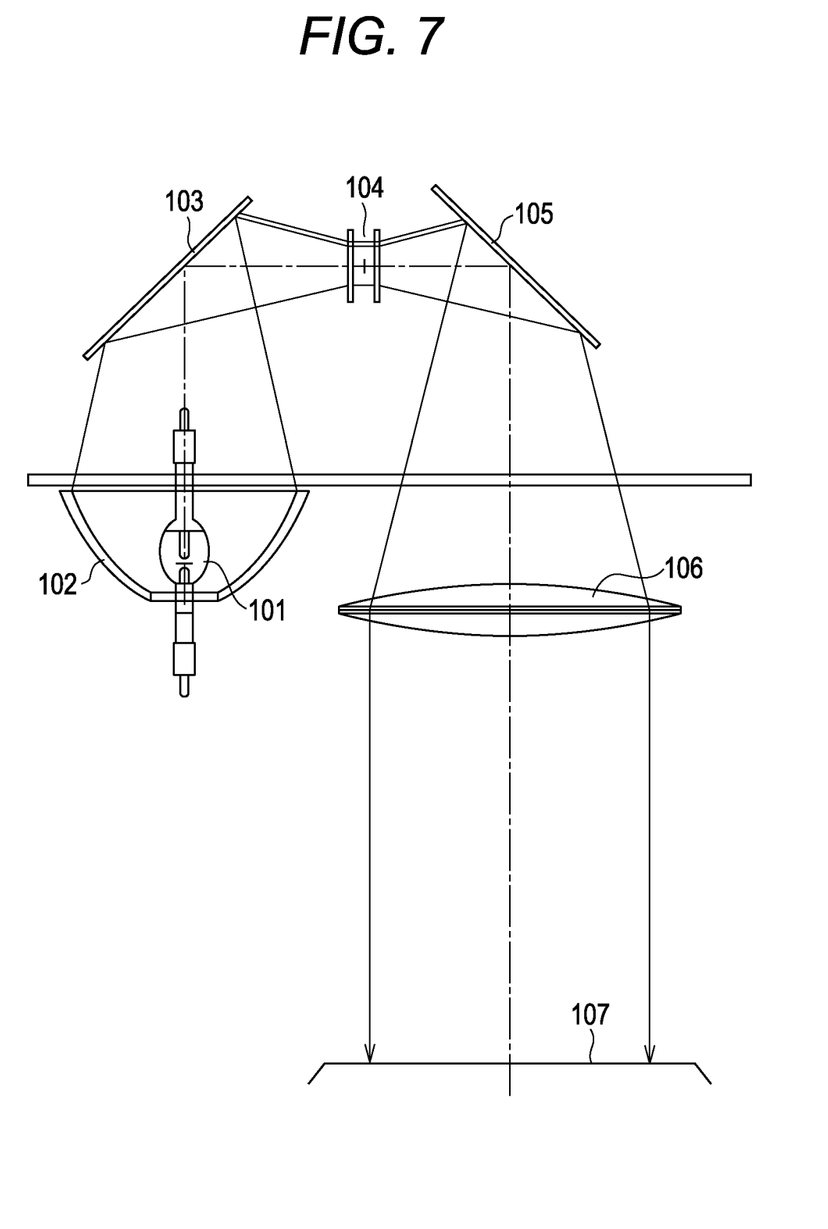
FIG. 7 is a diagram illustrating the outline of an optical system of a solar simulator used in standard solar cell measurement according to the related art.

FIG. 7 illustrates the outline of an optical system of a solar simulator used in standard solar cell measurement according to the related art.

As illustrated in FIG. 7, in the optical system, light emitted from a discharge lamp 101 is reflected by an elliptical reflection mirror 102 and radiated to an opening of the elliptical reflection mirror 102. The radiated light is irradiated onto an irradiation surface 107 (surface of a solar cell module) through a plane reflection mirror 103, an integrator lens 104 to make illuminance uniform, a plane reflection mirror 105, and a collimation lens 106 to collimate diffusion light.

However, in the optical system, the collimation lens 106 is used. The collimation lens 106 has spherical aberration. For this reason, illuminance ununiformity is generated in a concentric circle shape in the irradiation surface 107, and it is very difficult to improve uniformity of illuminance in the irradiation surface 107 having a large area as the solar cell module. The illuminance ununiformity can be slightly alleviated by changing a shape of the collimation lens 106, but in principle it is impossible to completely remove the illuminance ununiformity. In addition to the spherical aberration, due to multiple reflections generated between both surfaces of the collimation lens 106 and the irradiation surface 107 (surface of the solar cell module), illuminance of a central portion of an optical axis of the collimation lens 106 may become higher than those of the other portions. As a result, disturbance in the uniformity of the illuminance cannot be solved, even though all methods in the related art are used.

That is, in a solar simulator using the related art, illuminance ununiformity is large due to the spherical aberration and the multiple reflections and has a value significantly larger than values in a range of ±2% in the class A corresponding to the highest level in the standard measuring method. In particular, in regards to an influence by the multiple reflections, since the irradiation surface (surface of the solar cell) has reflectance different according to a kind thereof, even though uniformity of illuminance is maintained within a predetermined range using an arbitrary optical system with respect to a solar cell of an arbitrary kind, uniformity of illuminance may be out of the predetermined range with respect to a solar cell of a different kind. That is, a problem due to a variation factor such as different reflectance cannot be solved by a fixed device. That is, since an optical system needs to be changed according to each kind having different surface reflectance, an illumination device and an illumination method where illuminance with high uniformity is practically obtained is rarely realized, as long as the conventional method is used.

In the related art, in order to adjust illuminance of the light dispersed from the spectroscope having as large an area as the solar cell module to illuminance with high uniformity in the irradiation surface, two adjusting mechanisms that include adjustment in arrangement of an optical system including a diffraction grating for sweeping the spectral wavelength and adjustment based on an optical integrator at the back of an exit slit are adopted. However, in the first adjusting mechanism, regardless of the type of arrangement of the optical system adopted, when the diffraction grating is rotated for the purpose of sweeping the spectrum wavelength, beam uniformity obtained by the exit slit changes with respect to the wavelength and the width of the exit slit is not constant with respect to the wavelength. Therefore, even though the beam is used as incident light and uniformity of illuminance is adjusted by the optical system, it is difficult to improve uniformity of the illuminance in the irradiation surface having a large area. Even in the second adjusting mechanism, due to the color aberration or the spherical aberration of a fly eye lens used as the optical integrator, uniformity of illuminance to be obtained changes with respect to the wavelength. That is, even though the first and second adjusting mechanisms are used, a problem due to the variation factor such as the wavelength cannot be solved by the fixed device.

In the conventional spectroscope, a technology for actually measuring a change in irradiation uniformity of dispersed light due to the wavelength and adjusting the change in the uniformity does not exist. This is because the conventional spectral sensitivity measurement object is limited to a sample having an area smaller than that of the solar cell having about a square of 5 cm and uniformity of illuminance does not cause a severe problem. In recent years, a range of spectral sensitivity measurement objects is widened from a sample having as small an area as the solar cell to a sample having as large an area as the solar cell module, and an irradiation area needs to increase to about a square of several tens of centimeters. However, a technology for coping with illuminance uniformity of the spectroscope having as large an area as the solar cell module does not exist.

Reference may be made to, for example, Japanese Patent Application Laid-Open Nos. 5-183851, 8-146911, and 2002-189178.

SUMMARY OF THE INVENTION

The present invention has been made in view of the above problems and it is an object of the present invention to provide an illumination apparatus and an illumination method that monitor an illuminance distribution of irradiation light emitted from a spectroscope and having different wavelengths in real time, use a digital mirror device (DMD) configured by two-dimensionally arranging plural minute mirrors used in digital light processing (DLP: registered trademark) and controllable to be opened/closed on a planar substrate, control illuminance of minute portions of an irradiation surface, and obtain monochrome irradiation light with high illuminance uniformity in a range of ±2% needed for standard measurement of a solar cell and suitable for a class A of a highest level.

It is another object of the present invention to provide an illumination apparatus and an illumination method that control irradiation light in real time for solar cells of various kinds using a DMD, remove an influence due to aberration or multiple reflections of a collimation lens in the related art, and obtain irradiation light with high illuminance uniformity in a range of ±2% needed for standard measurement of the solar cell and suitable for a class A of a highest level.

In order to solve the above problems, according to a first aspect, there is provided an illumination apparatus in which illuminance of light radiated from a light source in an irradiation surface is adjusted to have high uniformity. The illumination apparatus includes the light source that emits a light beam having a rectangular shape; a DMD on which light emitted from the light source is incident and which controls reflection/non-reflection of the incident light by opening/closing control of minute mirrors; an optical system that shapes the light reflected by the DMD; a monitor half mirror that splits the light emitted from the optical system into irradiation light and monitor light; the irradiation surface irradiated with the irradiation light; a monitor unit that measures illuminance of the monitor light; and a control unit that transmits a control signal to control opening/closing of the minute mirrors of the DMD to the DMD, based on a measurement result measured by the monitor unit. In this case, an illuminance distribution in the irradiation surface is adjusted to a predetermined value.

According to a second aspect, in the first aspect, the light emitted from the light source is dispersed light emitted from a spectroscope.

According to a third aspect, in the first aspect, a control half mirror to split the light emitted from the light source into reflected primary light and transmissive light and a reflection mirror to reflect the transmissive light transmitted through the control half mirror are disposed between the light source and the DMD. The DMD is a DMD on which light reflected by the reflection mirror is incident and which controls reflection/non-reflection of the incident reflected light by opening/closing control of the minute mirrors. The optical system is an optical system that shapes light where the primary light and secondary light reflected by the DMD are synthesized.

According to a fourth aspect, in the third aspect, the light source is a light source for a solar simulator.

According to a fifth aspect, in any one of the first to fourth aspects, the monitor unit is composed of a CCD.

According to a sixth aspect, there is provided an illumination method that quickly adjusts illuminance of the light radiated from the light source in the irradiation surface to have high uniformity, in the illumination apparatus of the first or second aspect. The illumination method includes a first step of emitting the light from the light source to the DMD; a second step of selecting mirrors (hereinafter, referred to as selected mirrors) corresponding to a plurality of light source image groups, such that light source images projected on the monitor unit include the adjacent light source image groups; a third step of measuring illuminances of stray light corresponding to positions of the selected mirrors in the monitor unit and storing the illuminances, in a stray light state where all of the mirrors of the DMD are closed; a fourth step of sequentially opening the selected mirrors one by one and closing the other selected mirrors, measuring the illuminances of light corresponding to the positions of the selected mirrors to be sequentially opened in the monitor unit and storing the illuminances; a fifth step of subtracting the illuminances of the stray light acquired in the third step from the illuminances of the light acquired in the fourth step for the individual selected mirrors, calculating real illuminances of light corresponding to the positions of all of the selected mirrors, generating a correspondence table including the real illuminances corresponding to the positions of all of the selected mirrors, and storing the correspondence table; a sixth step of selecting the four selected mirrors forming a minimum rectangle from the selected mirrors, performing planar linear interpolation on the illuminances of the light corresponding to the positions of remaining mirrors (hereinafter, referred to as non-selected mirrors) positioned in the rectangle formed by the four selected mirrors, from the illuminances of the light corresponding to the positions of the selected individual selected mirrors and calculating the illuminances, repeating the calculating process until the illuminances corresponding to the positions of all of the non-selected mirrors are calculated, calculating the real illuminances of light corresponding to the positions of all the non-selected mirrors, generating a correspondence table including the real illuminances of the light corresponding to the positions of all the non-selected mirrors, and storing the correspondence table; a seventh step of opening all the mirrors of the DMD, measuring the illuminance in the monitor unit, and calculating a mean illuminance $\Phi$mean, a maximum illuminance $\Phi$max, a minimum illuminance $\Phi$min, and a position of the maximum illuminance $\Phi$max from the measured illuminance; an eighth step of setting $\Delta$ as an arbitrary constant and determining whether conditions of maximum illuminance $\Phi$max/mean illuminance $\Phi$mean<1+$\Delta$ and minimum illuminance $\Phi$min/mean illuminance $\Phi$mean>1−$\Delta$ are satisfied; and a ninth step of ending a process when the conditions are satisfied and closing the mirror corresponding to a position (Xmax, Ymax) indicating the maximum illuminance $\Phi$max or the mirror and the peripheral mirrors thereof, based on all the correspondence tables, when the conditions are not satisfied. The process of the eighth step is repeated and it is determined whether the conditions are satisfied. When the conditions are not satisfied, in the ninth step, the remaining mirror corresponding to the position indicating the maximum illuminance or the mirror and the peripheral mirrors thereof are closed, based on all the correspondence tables, the process of the ninth step is repeated, and the illuminance distribution in the irradiation surface is quickly adjusted to a predetermined value.

According to a seventh aspect, in the sixth aspect, in the ninth step, when the conditions are not satisfied, all of the mirrors corresponding to the positions indicating the illuminance larger than the predetermined illuminance are closed, based on all the correspondence tables, instead of closing the mirror corresponding to the position indicating the maximum illuminance $\Phi$max or the mirror and the peripheral mirrors thereof, based on all the correspondence tables.

According to an eighth aspect, there is provided an illumination method that quickly adjusts illuminance of the light radiated from the light source in the irradiation surface to have high uniformity, in the illumination apparatus of the third or fourth aspect. The illumination method includes an eleventh step of emitting the light from the light source to the control half mirror; a twelfth step of selecting mirrors (hereinafter, referred to as selected mirrors) corresponding to a plurality of light source image groups, such that light source images projected on the monitor unit include the adjacent light source image groups; a thirteenth step of measuring illuminances of stray light corresponding to positions of the selected mirrors in the monitor unit and storing the illuminances, in a stray light state where all of the mirrors of the DMD are closed; a fourteenth step of sequentially opening the selected mirrors one by one and closing the other selected mirrors, measuring the illuminances of light corresponding to the positions of the selected mirrors to be sequentially opened in the monitor unit and storing the illuminances; a fifteenth step of subtracting the illuminances of the stray light acquired in the thirteenth step from the illuminances of the light acquired in the fourteenth step for the individual selected mirrors, calculating real illuminances of light corresponding to the positions of all of the selected mirrors, generating a correspondence table including the real illuminances corresponding to the positions of all of the selected mirrors, and storing the correspondence table; a sixteenth step of selecting the four selected mirrors forming a minimum rectangle from the selected mirrors, performing planar linear interpolation on the illuminances of the light corresponding to the positions of remaining mirrors (hereinafter, referred to as non-selected mirrors) positioned in the rectangle formed by the four selected mirrors, from the illuminances of the light corresponding to the positions of the selected individual selected mirrors and calculating the illuminances, repeating the calculating process until the illuminances corresponding to the positions of all of the non-selected mirrors are calculated, calculating the real illuminances of light corresponding to the positions of all the non-selected mirrors, generating a correspondence table including the real illuminances of the light corresponding to the positions of all the non-selected mirrors, and storing the correspondence table; a seventeenth step of opening all the mirrors of the DMD, measuring the illuminance in the monitor unit, and calculating a mean illuminance Φmean, a maximum illuminance Φmax, a minimum illuminance Φmin, and a position of the maximum illuminance Φmax from the measured illuminance; an eighteenth step of setting Δ as an arbitrary constant and determining whether conditions of maximum illuminance Φmax/mean illuminance Φmean<1+Δ and minimum illuminance Φmin/mean illuminance Φmean>1−Δ are satisfied; and a nineteenth step of ending a process when the conditions are satisfied and closing the mirror corresponding to the position indicating the maximum illuminance Φmax or the mirror and the peripheral mirrors thereof, based on all the correspondence tables, when the conditions are not satisfied. The process of the eighteenth step is repeated and it is determined whether the conditions are satisfied. When the conditions are not satisfied, in the nineteenth step, the remaining mirror corresponding to the position indicating the maximum illuminance or the mirror and the peripheral mirrors thereof are closed, based on all the correspondence tables, the process of the eighteenth step is repeated, and the illuminance distribution in the irradiation surface is quickly adjusted to a predetermined value.

According to a ninth aspect, in the eighth aspect, in the nineteenth step, when the conditions are not satisfied, all of the mirrors corresponding to the positions indicating the illuminance larger than the predetermined illuminance are closed, based on all the correspondence tables, instead of closing the mirror corresponding to the position indicating the maximum illuminance Φmax or the mirror and the peripheral mirrors thereof, based on all the correspondence tables.

According to the illumination apparatus and the illumination method of the present invention enabling the illumination with high uniformity, it is possible to realize, at a high speed, an illumination apparatus and an illumination method enabling uniformity of an irradiation surface in which uniformity of illuminance of irradiation light emitted from a spectroscope having a large area or a solar simulator is suitable for a class A corresponding to a highest level of a standard measuring method applied to a sample having as large an area as a solar cell module. That is, according to the illumination apparatus and the illumination method of the present invention where the illuminance with high uniformity is obtained, the uniformity of the irradiation surface in the solar cell can be maintained within a range of ±2%, which is uniformity of the illuminance defined in a class A of a highest level of standard measurement of the solar cell.

DETAILED DESCRIPTION OF THE INVENTION

Figure 1:
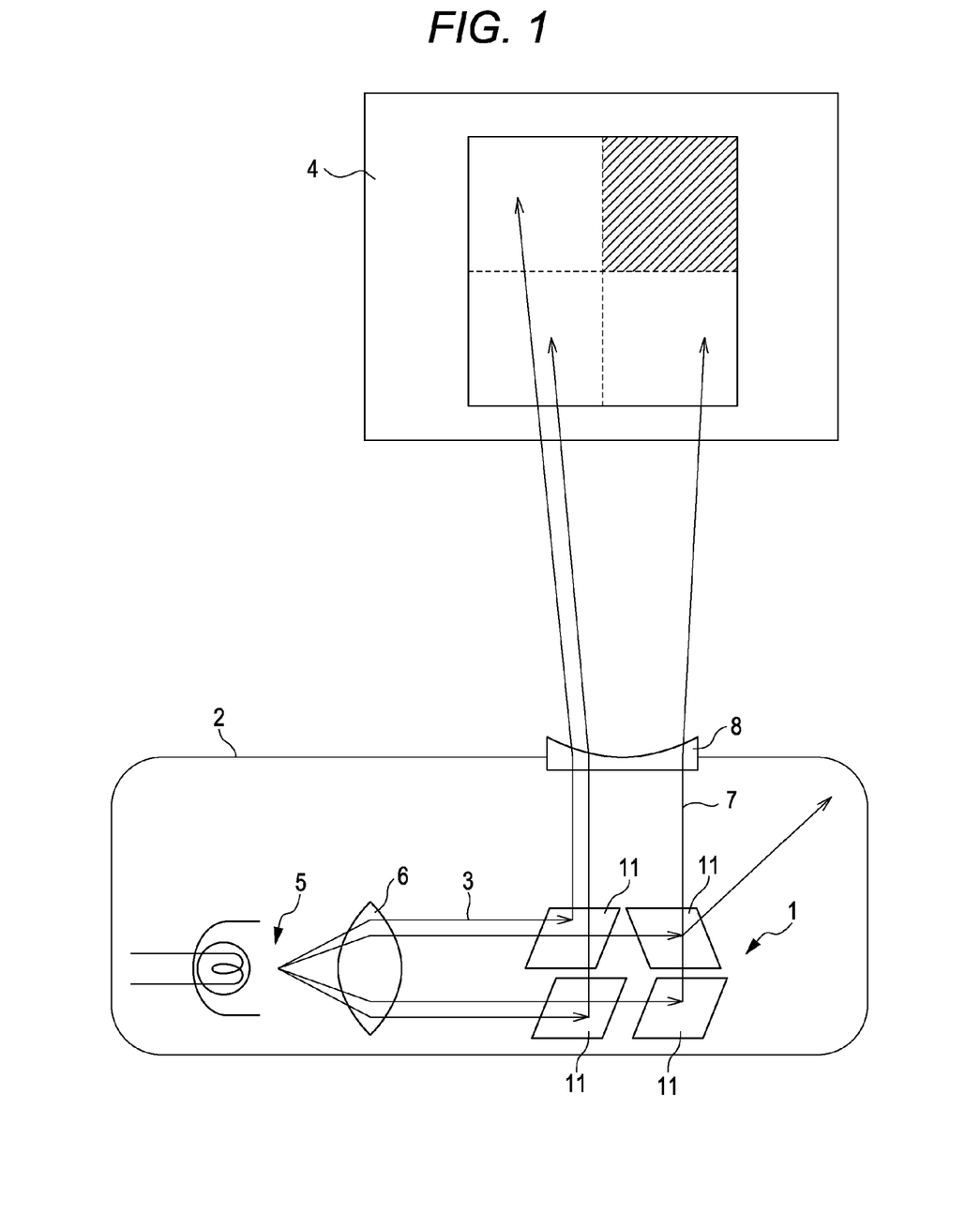
FIG. 1 is a schematic diagram illustrating screen control of a projector using DLP.

Before exemplary embodiments of the present invention are described, a DLP applied to the exemplary embodiments will be first described using FIG. 1. FIG. 1 schematically illustrates screen control of a projector using the DLP.

In FIG. 1, a DLP 1 is typically applied to a projector 2. A light beam 3 is irradiated onto plural minute mirrors (DMD) 11 on a digitally-controlled IC of the DLP 1 and is subjected to ON/OFF control by opening/closing of the plural minute mirrors (DMD) 11, and light reflected by the plural minute mirrors (DMD) 11 is projected onto a screen 4 and projects and displays an image. As a projection system of the projector, a system using liquid crystal exists. However, a system using the DLP is excellent in terms of an operation speed, light use efficiency, and durability.

The screen control of the projector based on the DLP illustrated in FIG. 1 will be described in detail. In this case, only the four minute mirrors of the DMD 11 are illustrated for convenience of explanation.

As illustrated in FIG. 1, light emitted from a point light source 5 becomes collimated light by a first lens 6 and is incident on the DLP 1. The light beams 3 are incident on the minute mirror (DMD) 11 on the IC, individually subjected to ON/OFF by opening/closing of the individual mirrors (DMD) 11, and become collimated light beams 7 where an image is reflected. Then, the collimated light beams 7 are diffused by a second lens 8 and projected as a white (opening) or black (closing) image on the screen 4. In this case, an optical path of the light beam emitted from the point light source 5, passing through the mirror (DMD) 11 at an arbitrary position on the DLP 1, and reaching the screen 4 does not cross an optical path of a light beam that passes through the mirror (DMD) 11 at another position. Accordingly, if a combination of the point light source 5, the DMD 11, and the screen 4 is further schematically illustrated, the light of the point light source 5 may pass through a wall (DMD) where numerous pin holes are arranged and reach the screen 4. At this time, a shape of an image projected on the screen 4 is determined by opening/closing of the pin holes of the wall (DMD).

Next, a first embodiment of the present invention will be described using FIGS. 2 to 4.

Figure 2:
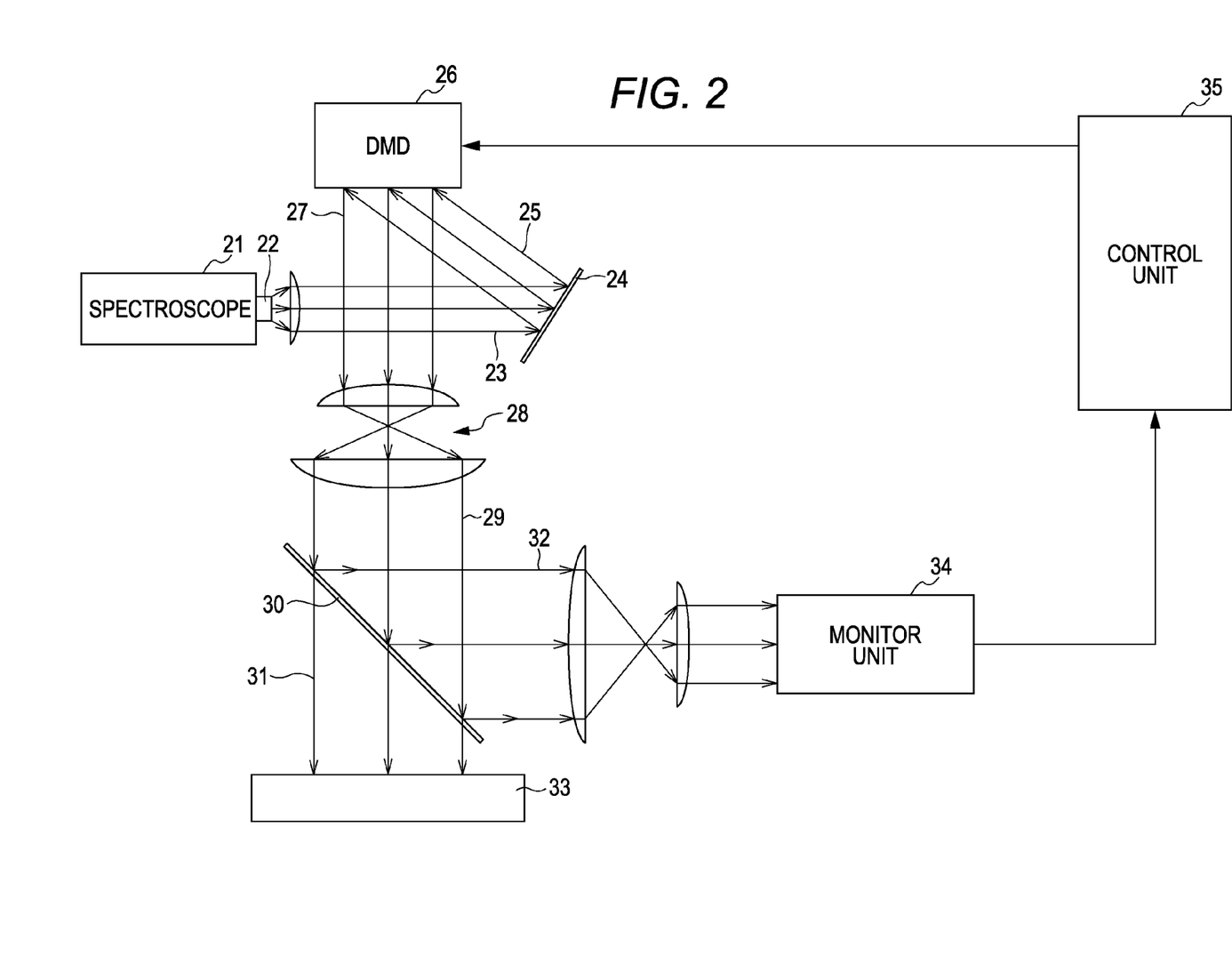
FIG. 2 is a diagram illustrating the outline of an illumination apparatus according to a first embodiment that is applied to a spectroscope having as large an area as a solar cell module and obtains illuminance with high uniformity.

FIG. 2 illustrates the outline of an illumination apparatus applied to a spectroscope having as large an area as a solar cell module and obtains illuminance with high uniformity.

As illustrated in FIG. 2, dispersed light 23 of a spectroscope 21 emitted from an exit port 22 composed of an optical slit is reflected by a plane reflection mirror 24 and becomes reflected light 25, and is incident on a DMD 26 that includes minute mirrors of several tens to several millions having a specula size of several tens of micrometers and arranged in a lattice. By opening/closing the minute mirrors of the DMD 26, the incident reflected light 25 is controlled and becomes reflected light 27, and is emitted to an irradiation surface 33. The reflected light 27 is shaped by an optical system 28 composed of a collimation lens and becomes collimated light 29, and is incident on a monitor half mirror 30. The collimated light 29 incident on the monitor half mirror 30 is split into irradiation light 31 and monitor light 32. Illuminance of the split monitor light 32 is measured by a monitor unit 34 composed of a CCD including two-dimensional image sensors, at a position equivalent to the irradiation surface 33. Measurement data measured by the monitor unit 34 and obtained from a CCD element corresponding to each pixel of the CCD is input to a control unit 35. The control unit 35 calculates opening/closing control data of each minute mirror of the DMD 26, based on the measurement data. For example, the control unit 35 controls opening/closing of each minute mirror of the DMD 26, such that the reflected light 25 of the minute mirror that belongs to a region having high illuminance is not reflected on the side of the irradiation surface 33. By the opening/closing control of the minute mirror of the DMD 26, a distribution of illuminance measured by the monitor unit 34 becomes almost a uniform illuminance distribution. By repeating the process sequence plural times, the light can be adjusted to monochrome irradiation light where the illuminance distribution in the irradiation surface 33 has a predetermined constant value, that is, illuminance with high uniformity within a range of ±2% defined in a class A of a highest level of standard measurement of the solar cell.

Figure 3:
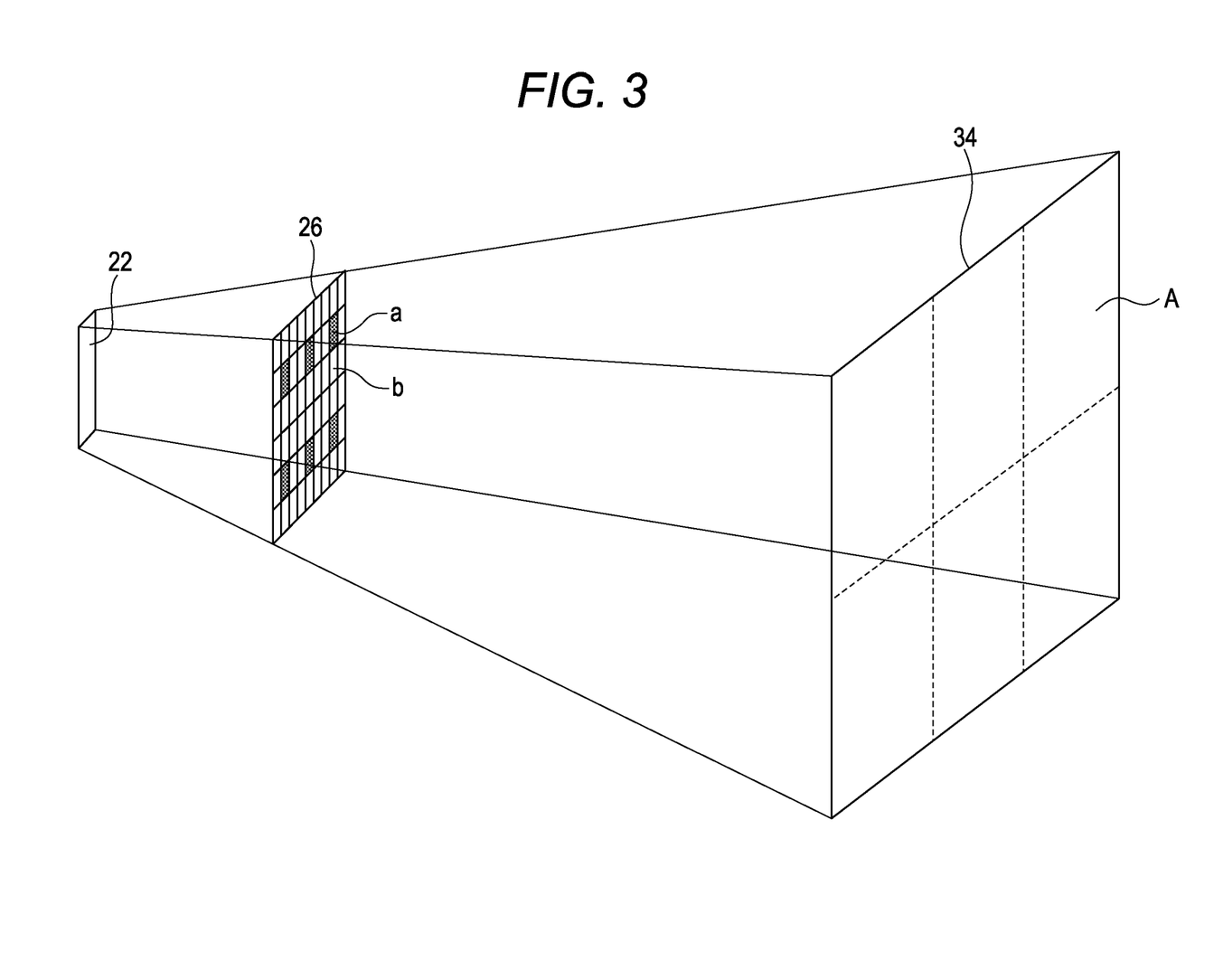
FIG. 3 is a schematic diagram illustrating an illumination method according to the first embodiment that obtains illuminance with high uniformity.

FIG. 3 schematically illustrates an illumination method enabling illuminance with high uniformity according to the first embodiment.

As illustrated in FIG. 3, the dispersed light 23 of the spectroscope 21 emitted from the exit port 22 composed of the optical slit may pass through the plural pin holes (corresponding to the plural minute mirrors of several tens to several millions having a specula size of several tens of micrometers and arranged in a lattice) of the DMD 26, and may be diffused and irradiated onto the surface of the monitor unit 34 of the CCD. By making the illuminance of the surface of the monitor unit 34 uniform, the illuminance in the irradiation surface 33 can be made uniform. In this case, the light emitted from the exit port 22 is irradiated over the entire DMD 26. However, if the DMD 26 is formed of the plural pin holes (plural minute mirrors), first, illuminances of plural light source image groups A that correspond to the positions of the selected pin holes (selected mirrors a) and are projected on the monitor unit 34 are measured. Meanwhile, illuminances of portions that correspond to the positions of the non-selected pin holes (non-selected mirrors b) are calculated by planar linear interpolation processing, based on the measured illuminances corresponding to the positions of the selected mirrors a, in the control unit 35. Thereby, the control unit 35 can acquire illuminance corresponding to each position of the selected mirror a and the non-selected mirror b. When the illuminance is measured by the selected mirrors a, a long time is needed because the illuminance needs to be measured by each selected mirror a. That is, since the processing in the control unit 35 is executed by a computer, a processing time does not cause a problem. However, when opening/closing of the plural minute mirrors of several tens to several millions arranged in a lattice in the DMD 26 is sequentially controlled, a long processing time is needed. For this reason, in order to reduce the time needed to sequentially control opening/closing of the plural minute mirrors in the DMD 26, opening/closing of the plural selected mirrors a is controlled within a range that does not adversely affect the process of making the illuminance uniform. As a result, according to the illumination method enabling the illuminance with high uniformity in the first embodiment, the time needed to control opening/closing can be reduced to about the number N of the selected mirrors a/the total number of minute mirrors (several tens to several millions). Specifically, the time needed to monitor the light source image data by one selected mirror is about 1 sec. and the time needed to calculate an interpolation coefficient common to the light source images by about 10,000 non-selected mirrors is about 1 sec.

Figure 4:
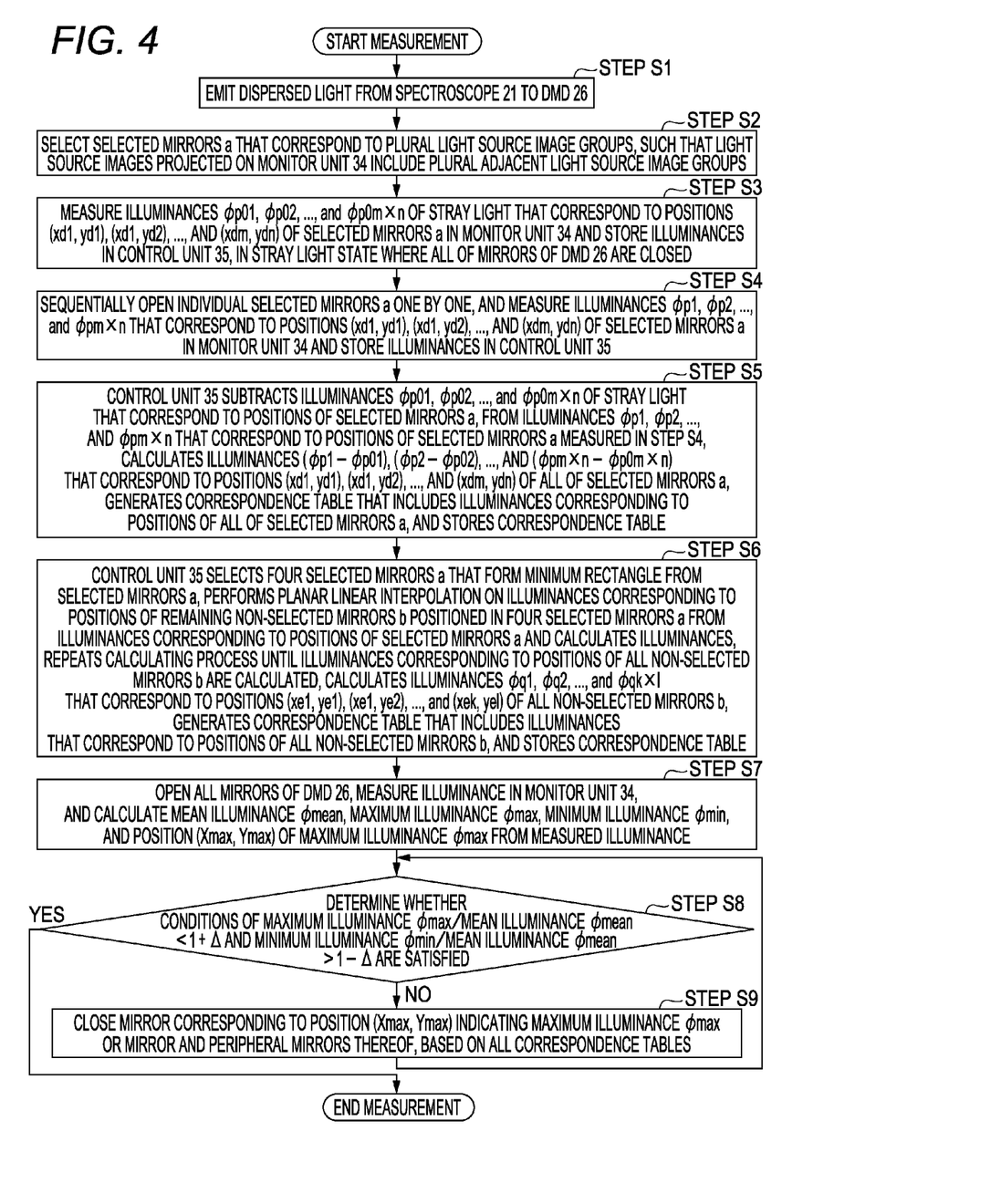
FIG. 4 is a flowchart illustrating a process sequence of the illumination method according to the first embodiment that obtains illuminance with high uniformity.

FIG. 4 is a flowchart illustrating a process sequence of the illumination method to quickly obtain the illuminance with high uniformity, in the illumination apparatus according to the first embodiment illustrated in FIG. 2. In the illumination method enabling illuminance with high uniformity according to the first embodiment, since the dispersed light emitted from the spectroscope 21 is generally weaker than the light emitted from the light source for the solar simulator, peak load leveling control that deletes a peak value of light causing ununiformity of light in the irradiation surface 33 is performed.

First, if the measurement starts, in step S1, the light dispersed from the spectroscope 21 (exit port 22) is emitted to the DMD 26.

Next, in step S2, the mirrors (hereinafter, referred to as selected mirrors a) that correspond to light source image groups are selected, such that the light source images projected on the monitor unit 34 include plural adjacent light source image groups.

Next, in step S3, in a stray light state where all of the mirrors of the DMD 26 are closed, illuminances $\Phi p01$, $\Phi p02$, . . . , and $\Phi p0m \times n$ of the stray light that correspond to the positions (xd1, yd1), (xd1, yd2), . . . , and (xdm, ydn) of the selected mirrors a are measured in the monitor unit 34 and are stored in the control unit 35.

Next, in step S4, the individual selected mirrors a are sequentially opened (when one mirror is opened, the other mirrors are closed) one by one, and the monitor unit 34 measures the illuminances $\Phi p1$, $\Phi p2$, . . . , and $\Phi pm \times n$ that correspond to the positions (xd1, yd1), (xd1, yd2), . . . , and (xdm, ydn) of the selected mirrors a and stores the illuminances in the control unit 35.

Next, in step S5, the control unit 35 subtracts the illuminances $\Phi p01$, $\Phi p02$, . . . , and $\Phi p0m \times n$ of the stray light that correspond to the positions (xd1, yd1), (xd1, yd2), . . . , and (xdm, ydn) of the selected mirrors a, from the illuminances $\Phi p1$, $\Phi p2$, . . . , and $\Phi pm \times n$ that correspond to the positions (xd1, yd1), (xd1, yd2), . . . , and (xdm, ydn) of the selected mirrors a measured in step S4, calculates (real) illuminances ($\Phi p1 - \Phi p01$), ($\Phi p2 - \Phi p02$), . . . , and ($\Phi pm \times n - \Phi p0m \times n$) that correspond to the positions (xd1, yd1), (xd1, yd2), . . . , and (xdm, ydn) of all of the selected mirrors a, generates a correspondence table that includes the (real) illuminances corresponding to the positions (xd1, yd1), (xd1, yd2), ..., and (xdm, ydn) of all of the selected mirrors a, and stores the correspondence table.

Next, in step S6, the control unit 35 selects the four selected mirrors a that form a minimum rectangle from the selected mirrors a, performs planar linear interpolation on the illuminances corresponding to the positions of the remaining mirrors (hereinafter, referred to as non-selected mirrors b) positioned in the rectangle formed by the four selected mirrors a from the illuminances corresponding to the positions of the selected mirrors a and calculates the illuminances, repeats the calculating process until the illuminances corresponding to the positions of all of the non-selected mirrors b are calculated, calculates the illuminances Φq1, Φq2, ..., and Φqk×l that correspond to the positions (xe1, ye1), (xe1, ye2), ..., and (xek, yel) of all the non-selected mirrors b, generates a correspondence table that includes the illuminances Φq1, Φq2, ..., and Φqk×l that correspond to the positions (xe1, ye1), (xe1, ye2), ..., and (xek, yel) of all the non-selected mirrors b, and stores the correspondence table.

Next, in step S7, the control unit opens all the mirrors of the DMD 26, measures the illuminance in the monitor unit 34, and calculates the mean illuminance Φmean, the maximum illuminance Φmax, the minimum illuminance Φmin, and the position (Xmax, Ymax) of the maximum illuminance Φmax from the measured illuminance.

Next, in step S8, the control unit sets Δ as an arbitrary constant and determines whether conditions of maximum illuminance Φmax/mean illuminance Φmean<1+Δ and minimum illuminance Φmin/mean illuminance Φmean>1−Δ are satisfied.

Next, in step S9, when the conditions of step S8 are satisfied, the control unit ends the process, and when the conditions of step S8 are not satisfied, the control unit closes the mirror corresponding to the position (Xmax, Ymax) indicating the maximum illuminance Φmax or the mirror and the peripheral mirrors thereof, based on all the correspondence tables (correspondence tables including the illuminances corresponding to the positions of all the mirrors obtained by steps S5 and S6).

Next, the control unit repeats the process of step S8 and determines whether the conditions are satisfied. When the conditions are not satisfied, in step S9, the control unit closes the remaining mirror corresponding to the position indicating the maximum illuminance or the mirror and the peripheral mirrors thereof, based on all the correspondence tables, repeats the process of step S8, and quickly adjusts the illuminance distribution in the irradiation surface 33 to a predetermined value.

In step S9, when the conditions are not satisfied, the control unit may close all of the mirrors corresponding to the positions indicating the illuminance larger than the predetermined illuminance, based on all the correspondence tables, instead of closing the mirror corresponding to the position (Xmax, Ymax) indicating the maximum illuminance Φmax or the mirror and the peripheral mirrors thereof, based on all the correspondence tables. As a result, the processing speed can be further improved.

Next, a second embodiment of the present invention will be described using FIGS. 5 and 6.

Figure 5:
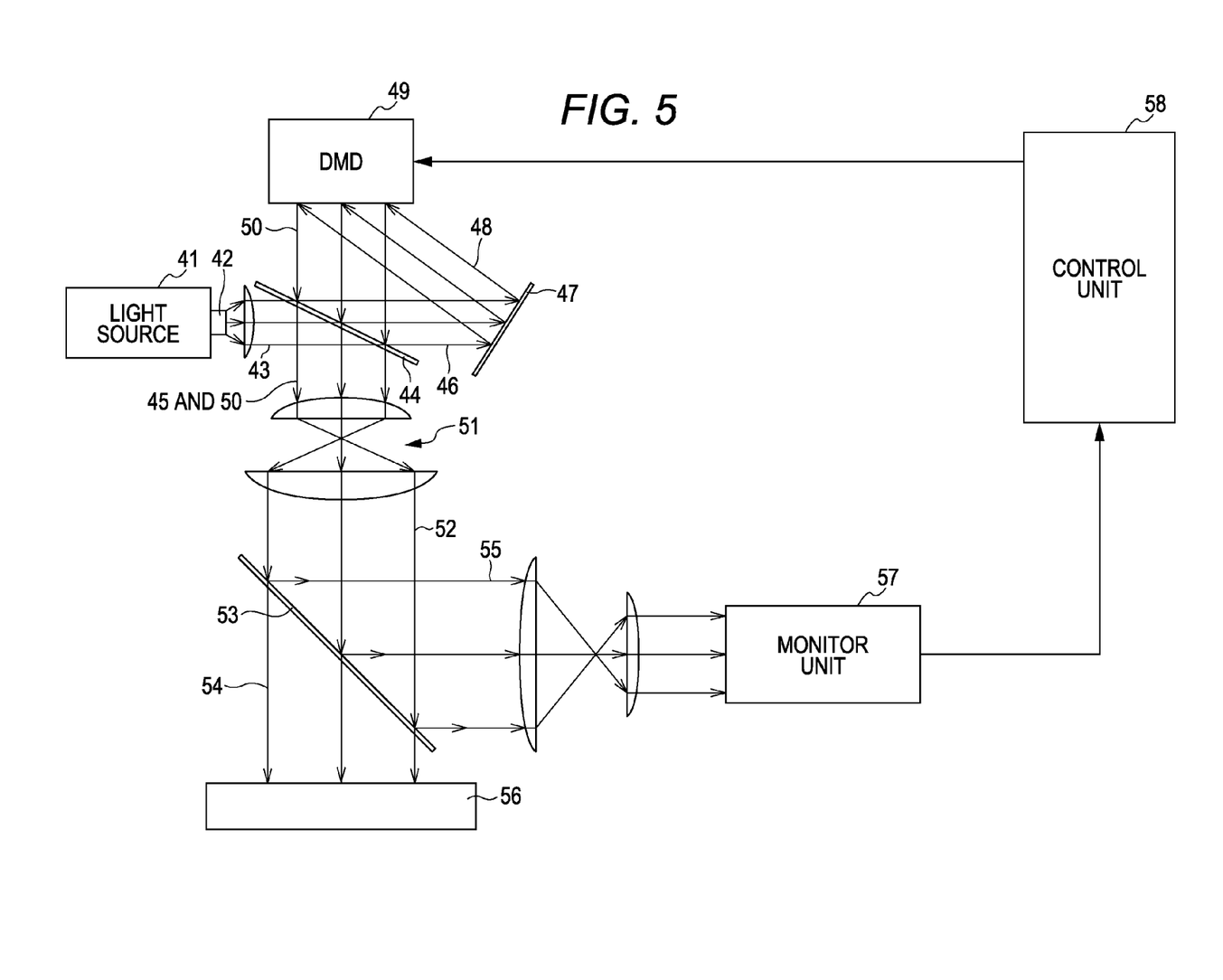
FIG. 5 is a diagram illustrating the outline of an illumination apparatus according to a second embodiment that is applied to large area irradiation of a solar simulator and obtains illuminance with high uniformity.

FIG. 5 illustrates the outline of an illumination apparatus applied to large area irradiation of a solar simulator and obtains illuminance with high uniformity.

As illustrated in FIG. 5, radiated light 43 of solar light emitted from a discharge lamp (not illustrated), reflected by an elliptical reflection mirror (not illustrated), and emitted from the exit port 42 of the light source 41 is split into reflected primary light 45 and transmissive light 46 by a control half mirror 44. The transmissive light 46 is reflected by a planar reflection mirror 47 having low reflectance and becomes reflected light 48 having low intensity, and is incident on a DMD 49 that includes minute mirrors of several tens to several millions having a specula size of several tens of micrometers and arranged in a lattice. The reason for using the planar reflection mirror 47 having low reflectance is to suppress intensity of the light incident on the DMD 49 to be lower than intensity of the solar light and prevent the deterioration due to the light incident on the DMD 49. Secondary light 50 reflected by the DMD 49 is transmitted through the control half mirror 44, is shaped by an optical system 51 including a collimation lens, together with the primary light 45 reflected by the control half mirror 44, and is incident on a monitor half mirror 53. Collimated light 52 including the primary light 45 and the secondary light 50 that are incident on the monitor half mirror 53 is split into irradiation light 54 and monitor light 55. The illuminance of the split monitor light 55 is measured by a monitor unit 57 composed of a CCD including two-dimensional image sensors, at a position equivalent to an irradiation surface 56. Measurement data measured by the monitor unit 57 and obtained from a CCD element corresponding to each pixel of the CCD is input to a control unit 58. The control unit 58 calculates opening/closing data of each minute mirror of the DMD 49, based on the measurement data. For example, the control unit 58 controls opening/closing of each minute mirror of the DMD 49, such that the reflected light 48 of the minute mirror that belongs to a region having low illuminance is reflected on the side of the irradiation surface 56. By the opening/closing control of the minute mirror of the DMD 49, a distribution of illuminance measured by the monitor unit 57 becomes almost a uniform illuminance distribution. By repeating the process sequence plural times, the illuminance distribution in the irradiation surface 56 can be adjusted to a predetermined constant value, that is, an illuminance distribution with high uniformity within a range of ±2% defined in a class A of a highest level of standard measurement of the solar cell.

Figure 6:
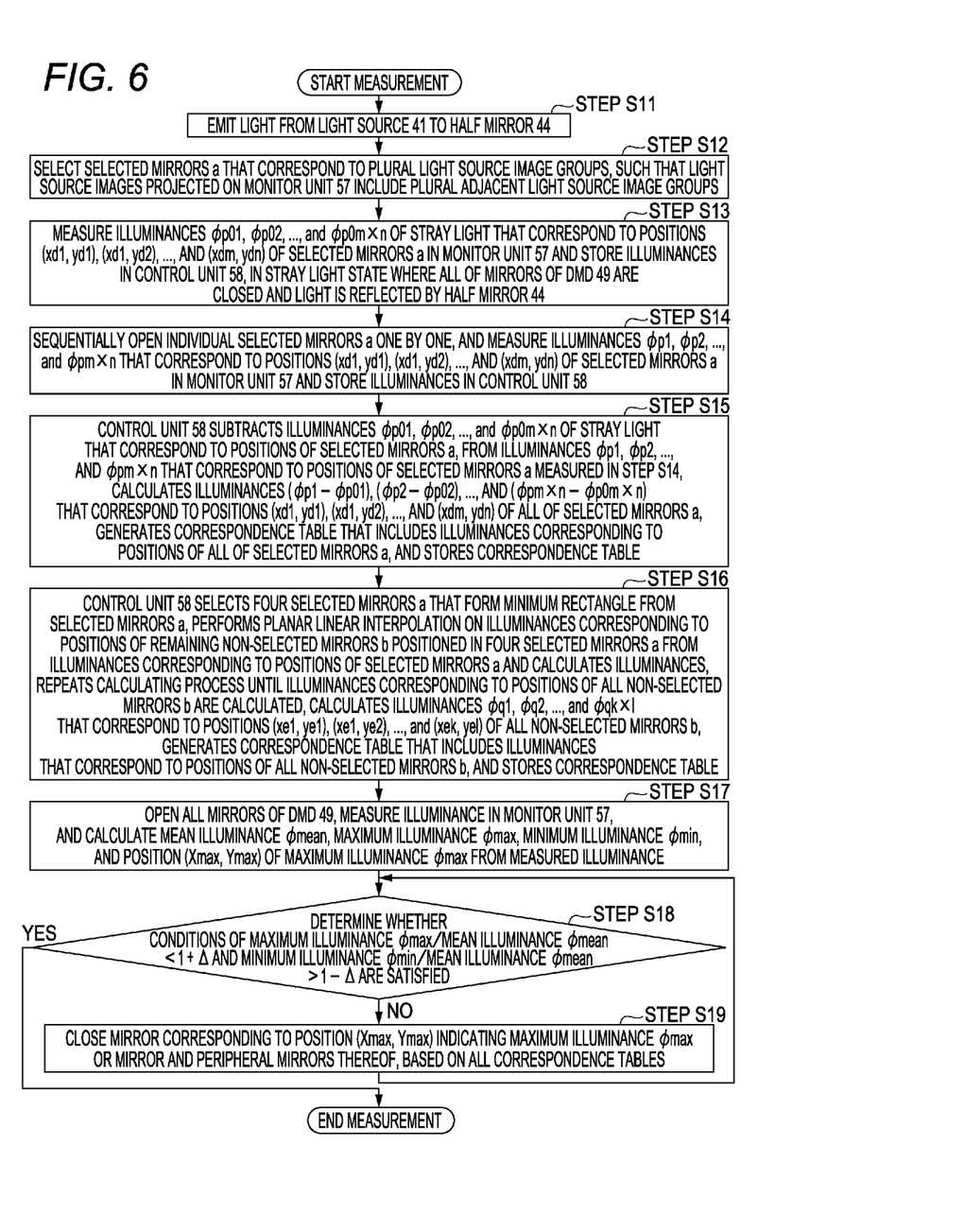
FIG. 6 is a flowchart illustrating a process sequence of an illumination method according to the second embodiment that obtains illuminance with high uniformity.

FIG. 6 is a flowchart illustrating a process sequence of the illumination method to quickly obtain the illuminance with high uniformity, in the illumination apparatus according to the second embodiment illustrated in FIG. 5.

In the illumination method enabling illuminance with high uniformity according to the second embodiment, in the case of the light source for the solar simulator, since the light emitted from the light source 41 is generally stronger than the dispersed light, filling control that raises a bottom value of light causing ununiformity of light in the irradiation surface 56 can be performed.

First, if the measurement starts, in step S11, the light from the light source 41 (exit port 42) is emitted to the control half mirror 44.

Next, in step S12, the mirrors (hereinafter, referred to as selected mirrors a) that correspond to light source image groups are selected, such that the light source images projected on the monitor unit 57 include plural adjacent light source image groups.

Next, in step S13, in a stray light state where all of the mirrors of the DMD 49 are closed and the light is reflected by the control half mirror 44, illuminances Φp01, Φp02, ..., and Φp0m×n of the stray light that correspond to the positions (xd1, yd1), (xd1, yd2), ..., and (xdm, ydn) of the selected mirrors a are measured in the monitor unit 57 and are stored in the control unit 58.

Next, in step S14, the individual selected mirrors a are sequentially opened (when one mirror is opened, the other mirrors are closed) one by one, and the monitor unit 57 measures the illuminances $\Phi p1, \Phi p2, \ldots,$ and $\Phi pm \times n$ that correspond to the positions (xd1, yd1), (xd1, yd2), ..., and (xdm, ydn) of the selected mirrors a and stores the illuminances in the control unit 58.

Next, in step S15, the control unit 58 subtracts the illuminances $\Phi p01, \Phi p02, \ldots,$ and $\Phi p0m \times n$ of the stray light that correspond to the positions (xd1, yd1), (xd1, yd2), ..., and (xdm, ydn) of the selected mirrors a, from the illuminances $\Phi p1, \Phi p2, \ldots,$ and $\Phi pm \times n$ that correspond to the positions (xd1, yd1), (xd1, yd2), ..., and (xdm, ydn) of the selected mirrors a measured in step S14, calculates (real) illuminances $(\Phi p1 - \Phi p01), (\Phi p2 - \Phi p02), \ldots,$ and $(\Phi pm \times n - \Phi p0m \times n)$ that correspond to the positions (xd1, yd1), (xd1, yd2), ..., and (xdm, ydn) of all of the selected mirrors a, generates a correspondence table that includes the illuminances corresponding to the positions (xd1, yd1), (xd1, yd2), ..., and (xdm, ydn) of all of the selected mirrors a, and stores the correspondence table.

Next, in step S16, the control unit 58 selects the four selected mirrors a that form a minimum rectangle from the selected mirrors a, performs planar linear interpolation on the illuminances corresponding to the positions of the remaining mirrors (hereinafter, referred to as non-selected mirrors b) positioned in the rectangle formed by the four selected mirrors a from the illuminances corresponding to the positions of the selected mirrors a and calculates the illuminances, repeats the calculating process until the illuminances corresponding to the positions of all of the non-selected mirrors b are calculated, calculates the illuminances $\Phi q1, \Phi q2, \ldots,$ and $\Phi qk \times l$ that correspond to the positions (xe1, ye1), (xe1, ye2), ..., and (xek, yel) of all the non-selected mirrors b, generates a correspondence table that includes the illuminances $\Phi q1, \Phi q2, \ldots,$ and $\Phi qk \times l$ that correspond to the positions (xe1, ye1), (xe1, ye2), ..., and (xek, yel) of all the non-selected mirrors b, and stores the correspondence table.

Next, in step S17, the control unit opens all the mirrors of the DMD 49, measures the illuminance in the monitor unit 57, and calculates the mean illuminance $\Phi$mean, the maximum illuminance $\Phi$max, the minimum illuminance $\Phi$min, and the position (Xmax, Ymax) of the maximum illuminance $\Phi$max from the measured illuminance.

Next, in step S18, the control unit sets $\Delta$ as an arbitrary constant and determines whether conditions of maximum illuminance $\Phi$max/mean illuminance mean $< 1 + \Delta$ and minimum illuminance $\Phi$min/mean illuminance $\Phi$mean $> 1 - \Delta$ are satisfied.

Next, in step S19, when the conditions of step S18 are satisfied, the control unit ends the process, and when the conditions of step S18 are not satisfied, the control unit closes the mirror corresponding to the position (Xmax, Ymax) indicating the maximum illuminance $\Phi$max or the mirror and the peripheral mirrors thereof, based on all the correspondence tables (correspondence tables including the illuminances corresponding to the positions of all the mirrors obtained by steps S15 and S16).

Next, the control unit repeats the process of step S18 and determines whether the conditions are satisfied. When the conditions are not satisfied, in step S19, the control unit closes the remaining mirror corresponding to the position indicating the maximum illuminance or the mirror and the peripheral mirrors thereof, based on all the correspondence tables, repeats the process of step S18, and quickly adjusts the illuminance distribution in the irradiation surface 56 to a predetermined value.

In step S19, when the conditions are not satisfied, the control unit may close all of the mirrors corresponding to the positions indicating the illuminance larger than the predetermined illuminance, based on all the correspondence tables, instead of closing the mirror corresponding to the position (Xmax, Ymax) indicating the maximum illuminance $\Phi$max or the mirror and the peripheral mirrors thereof, based on all the correspondence tables. As a result, the processing speed can be further improved.

In this case, a difference between use of the DLP (registered trademark) in the illumination apparatuses according to the embodiments enabling illuminance with high uniformity and use of the DLP in the projector will be described.

Even in the illumination apparatuses according to the embodiments enabling illuminance with high uniformity, the basic scheme where the light emitted from the light source passes through the DLP and reaches a sample surface corresponding to the screen is the same as that in the case of the projector. However, the illumination apparatus according to the embodiments enabling illuminance with high uniformity used in the spectroscope having a large area or the solar simulator is different from the projector in the following two points.

First, in the illumination apparatuses according to the embodiments enabling illuminance with high uniformity (illumination methods enabling illuminance with high uniformity), a type of the light source has expansion. That is, in regards to the type of the light source, the point light source is used in the case of the projector, a rectangle slit (exit port 22) is used in the case of the spectroscope having the large area according to the first embodiment, and an integrator having a square exit (exit port 42) is used in the case of the solar simulator according to the second embodiment. In the first and second embodiments, the light source is not the point light source and has an exit port with rectangular expansion. For this reason, an image drawn on the sample surface corresponding to the screen through the position of one mirror on the DMD becomes a rectangular or square light source image with expansion. That is, an image drawn on the irradiation surface corresponding to the screen is an overlapped image of the rectangular or square light source images through the plural opened mirror positions.

Second, in the illumination apparatuses according to the embodiments enabling illuminance with high uniformity (illumination methods enabling illuminance with high uniformity), in a state where the illuminance is not controlled by opening/closing the mirrors, the intensity of the light is not constant. That is, in the case of the spectroscope having the large area according to the first embodiment, illuminance of the light in a frame of the slit changes according to the wavelength. In the case of the solar simulator according to the second embodiment, when the illuminance of the light in a frame of the integrator changes, the illuminance of the center of the optical axis increases due to multiple reflections generated between the collimation lens and the surface of the solar cell. That is, if the kind of the solar cell changes, effective intensity of the light from the light source changes. Accordingly, an optimal solution of opening/closing the mirrors needs to be calculated according to each wavelength in the case of the spectroscope having the large area in the first embodiment and according to each kind in the case of the solar simulator in the second embodiment.

That is, the optimal solutions of opening/closing the mirrors of the DLP in the illumination apparatuses according to the embodiments enabling illuminance with high uniformity are obtained by repeating feedback control to the DMD.

In the illumination apparatuses according to the embodiments, the light is incident from the exit port 21 (42) of the rectangular frame with constant expansion, and the illuminance in the frame changes. When the light is affected by aberration of the optical system, the light is controlled in real time by opening/closing each mirror group of the DMD 26 (49), and the illuminance of the irradiation surface obtained as the overlapped image of the light source images is made uniform. The optimal solution to control each mirror group in real time is calculated by repeating the feedback control. The optimal solution of the mirror group control is mathematically calculated when the aberration of the optical system does not exist. In actuality, however, since the aberration exists, the feedback control needs to be performed. That is, in order to obtain the uniform illuminance distribution in the irradiation surface 33 (56), the sequence of measuring the illuminance of the light by the monitor unit 34 (57) disposed at a position equivalent to the irradiation surface 33 (56) and feeding the measured data back to the DMD 26 (49) for superior mirror group control is repeated, until the predetermined illuminance uniformity is obtained.

What is claimed is:

1. An illumination apparatus in which illuminance of light radiated from a light source in an irradiation surface is adjusted to have high uniformity, the illumination apparatus comprising:
   the light source that emits a light beam having a rectangular shape;
   a DMD on which light emitted from the light source is incident and which controls reflection/non-reflection of the incident light by opening/closing control of minute mirrors;
   an optical system that shapes the light reflected by the DMD;
   a monitor half mirror that splits the light emitted from the optical system into irradiation light and monitor light;
   the irradiation surface that is irradiated with the irradiation light;
   a monitor unit that measures illuminance of the monitor light; and
   a control unit that transmits a control signal to control opening/closing of the minute mirrors of the DMD to the DMD, based on a measurement result measured by the monitor unit,
   wherein an illuminance distribution in the irradiation surface is adjusted to a predetermined value,
   wherein the illumination apparatus further comprises a control half mirror which splits the light emitted from the light source into reflected primary light and transmissive light and a reflection mirror which reflects the transmissive light transmitted through the control half mirror, and
   wherein the control half mirror and the reflection mirror are disposed between the light source and the DMD along a path of the light beam.

2. The illumination apparatus according to claim 1, wherein the light source is a light source for a solar simulator.

3. The illumination apparatus according to claim 1, wherein the DMD on which light reflected by the reflection mirror is incident and which controls reflection/non-reflection of the incident reflected light by opening/closing control of the minute mirrors, and
   the optical system is an optical system that shapes light where the primary light and secondary light reflected by the DMD are synthesized.

4. An illumination method that quickly adjusts illuminance of the light radiated from the light source in the irradiation surface to have high uniformity, in the illumination apparatus according to claim 1, the illumination method comprising:
   a) emitting the light from the light source to the control half mirror;
   b) selecting mirrors corresponding to a plurality of light source image groups, such that light source images projected on the monitor unit include the adjacent light source image groups;
   c) measuring illuminances of stray light corresponding to positions of the selected mirrors in the monitor unit and storing the illuminances, in a stray light state where all of the mirrors of the DMD are closed;
   d) sequentially opening the selected mirrors one by one and closing the other selected mirrors, measuring the illuminances of light corresponding to the positions of the selected mirrors to be sequentially opened in the monitor unit and storing the illuminances;
   e) subtracting the illuminances of the stray light acquired in the step c) from the illuminances of the light acquired in the step d) for the individual selected mirrors, calculating resultant illuminances of light corresponding to the positions of all of the selected mirrors, generating a correspondence table including the resultant illuminances corresponding to the positions of all of the selected mirrors, and storing the correspondence table;
   f) selecting the four selected mirrors forming a minimum rectangle from the selected mirrors, performing planar linear interpolation on the illuminances of the light corresponding to the positions of remaining mirrors positioned in the rectangle formed by the four selected mirrors, from the illuminances of the light corresponding to the positions of the selected individual selected mirrors and calculating the illuminances, repeating the calculating process until the illuminances corresponding to the positions of all of the non-selected mirrors are calculated, calculating the resultant illuminances of light corresponding to the positions of all the non-selected mirrors, generating a correspondence table including the resultant illuminances of the light corresponding to the positions of all the non-selected mirrors, and storing the correspondence table;
   g) opening all the mirrors of the DMD, measuring the illuminance in the monitor unit, and calculating a mean illuminance $\Phi$mean, a maximum illuminance $\Phi$max, a minimum illuminance $\Phi$min, and a position of the maximum illuminance $\Phi$max from the measured illuminance;
   h) setting $\Delta$ as an arbitrary constant and determining whether conditions of maximum illuminance $\Phi$max/mean illuminance $\Phi$mean<1+$\Delta$ and minimum illuminance $\Phi$min/mean illuminance $\Phi$mean>1−$\Delta$ are satisfied; and
   i) ending a process when the conditions are satisfied and closing the mirror corresponding to the position indicating the maximum illuminance $\Phi$max or the mirror and the peripheral mirrors thereof, based on all the correspondence tables, when the conditions are not satisfied,
   wherein the process of the step h) is repeated and it is determined whether the conditions are satisfied, and
   when the conditions are not satisfied, in the step i), the remaining mirror corresponding to the position indicating the maximum illuminance or the mirror and the peripheral mirrors thereof are closed, based on all the correspondence tables, the process of the step i) is repeated, and the illuminance distribution in the irradiation surface is adjusted to a predetermined value.

5. The illumination method according to claim 4,
wherein, in the step i), when the conditions are not satisfied, all of the mirrors corresponding to the positions indicating the illuminance larger than the predetermined illuminance are closed, based on all the correspondence tables, instead of closing the mirror corresponding to the position indicating the maximum illuminance Φmax or the mirror and the
peripheral mirrors thereof, based on all the correspondence tables.

6. An illumination method that adjusts illuminance of the light radiated from the light source in the irradiation surface to have high uniformity, in an illumination apparatus in which illuminance of light radiated from a light source in an irradiation surface is adjusted to have high uniformity, the illumination apparatus comprising:
the light source that emits a light beam having a rectangular shape;
a DMD on which light emitted from the light source is incident and which controls reflection/non-reflection of the incident light by opening/closing control of minute mirrors;
an optical system that shapes the light reflected by the DMD;
a monitor half mirror that splits the light emitted from the optical system into irradiation light and monitor light;
the irradiation surface that is irradiated with the irradiation light;
a monitor unit that measures illuminance of the monitor light; and
a control unit that transmits a control signal to control opening/closing of the minute mirrors of the DMD to the DMD, based on a measurement result measured by the monitor unit,
wherein an illuminance distribution in the irradiation surface is adjusted to a predetermined value, the illumination method comprising:
a) emitting the light from the light source to the DMD;
b) selecting mirrors corresponding to a plurality of light source image groups, such that light source images projected on the monitor unit include the adjacent light source image groups;
c) measuring illuminances of stray light corresponding to positions of the selected mirrors in the monitor unit and storing the illuminances, in a stray light state where all of the mirrors of the DMD are closed;
d) sequentially opening the selected mirrors one by one and closing the other selected mirrors, measuring the illuminances of light corresponding to the positions of the selected mirrors to be sequentially opened in the monitor unit and storing the illuminances;
e) subtracting the illuminances of the stray light acquired in the step c) from the illuminances of the light acquired in the step d) for the individual selected mirrors, calculating resultant illuminances of light corresponding to the positions of all of the selected mirrors, generating a correspondence table including the resultant illuminances corresponding to the positions of all of the selected mirrors, and storing the correspondence table;
f) selecting the four selected mirrors forming a minimum rectangle from the selected mirrors, performing planar linear interpolation on the illuminances of the light corresponding to the positions of remaining mirrors positioned in the rectangle formed by the four selected mirrors, from the illuminances of the light corresponding to the positions of the selected individual selected mirrors and calculating the illuminances, repeating the calculating process until the illuminances corresponding to the positions of all of the non-selected mirrors are calculated, calculating the resultant illuminances of light corresponding to the positions of all the non-selected mirrors, generating a correspondence table including the resultant illuminances of the light corresponding to the positions of all the non-selected mirrors, and storing the correspondence table;
g) opening all the mirrors of the DMD, measuring the illuminance in the monitor unit, and calculating a mean illuminance Φmean, a maximum illuminance Φmax, a minimum illuminance Φmin, and a position of the maximum illuminance Φmax from the measured illuminance;
h) setting Δ as an arbitrary constant and determining whether conditions of maximum illuminance Φmax/mean illuminance Φmean<1+Δ and minimum illuminance Φmin/mean illuminance Φmean>1−Δ are satisfied; and
i) ending a process when the conditions are satisfied and closing the mirror corresponding to a position (Xmax, Ymax) indicating the maximum illuminance Φmax or the mirror and the peripheral mirrors thereof, based on all the correspondence tables, when the conditions are not satisfied,
wherein the process of the step h) is repeated and it is determined whether the conditions are satisfied, and
when the conditions are not satisfied, in the step i), the remaining mirror corresponding to the position indicating the maximum illuminance or the mirror and the peripheral mirrors thereof are closed, based on all the correspondence tables, the process of the step i) is repeated, and the illuminance distribution in the irradiation surface is adjusted to a predetermined value.

7. The illumination method according to claim 6,
wherein, in the step i), when the conditions are not satisfied, all of the mirrors corresponding to the positions indicating the illuminance larger than the predetermined illuminance are closed, based on all the correspondence tables, instead of closing the mirror corresponding to the position indicating the maximum illuminance Φmax or the mirror and the peripheral mirrors thereof, based on all the correspondence tables.

8. The illumination method according to claim 6, wherein the light emitted from the light source is dispersed light emitted from a spectroscope.

9. The illumination method according to claim 6, wherein the monitor unit is composed of a CCD.

10. The illumination method according to claim 6, wherein the control unit measures illuminances of the first group of mirrors and calculates illuminances of the second group of mirrors by planar linear interpolation processing based on the measured illuminances of the first group of mirrors.

* * * * *